United States Patent

McMillin

[15] 3,692,982

[45] Sept. 19, 1972

[54] DIGITALLY CONVERTED ANALOG DISCRIMINATION SYSTEM

[72] Inventor: John V. McMillin, P.O. Box 30, Iowa City, Iowa 52240

[22] Filed: Jan. 4, 1971

[21] Appl. No.: 103,417

[52] U.S. Cl.................235/61.11 E, 340/146.3 AG
[51] Int. Cl..............................................G06k 7/14
[58] Field of Search.......340/146.3 AG; 235/61.11 E

[56] References Cited

UNITED STATES PATENTS 3,166,743  1/1965  Greenwald.......340/146.3 AG
3,048,327  8/1962  Gewickey............235/61.11 E Primary Examiner—Maynard R. Wilbur
Assistant Examiner—Robert F. Gnuse
Attorney—Haven E. Simmons and James C. Nemmers

[57] ABSTRACT

A system for converting an analog light intensity signal from a photo sensor into a four level digital code. The system is used in connection with document scanners which have multiple response channels, each channel providing an analog signal which is then compared to various predetermined reference levels. The digital response produced from each such comparison is stored and the highest level produced during a predetermined cycle is gated out in a digital code. The outputs thus produced from all the channels are then multiplexed onto computer interface lines. The system thus provides for discrimination and selection of predetermined signal levels produced by the multiple channels.

3 Claims, 8 Drawing Figures

INVENTOR.
JOHN V. McMILLIN

BY Jones C. Nemmers

ATTORNEY

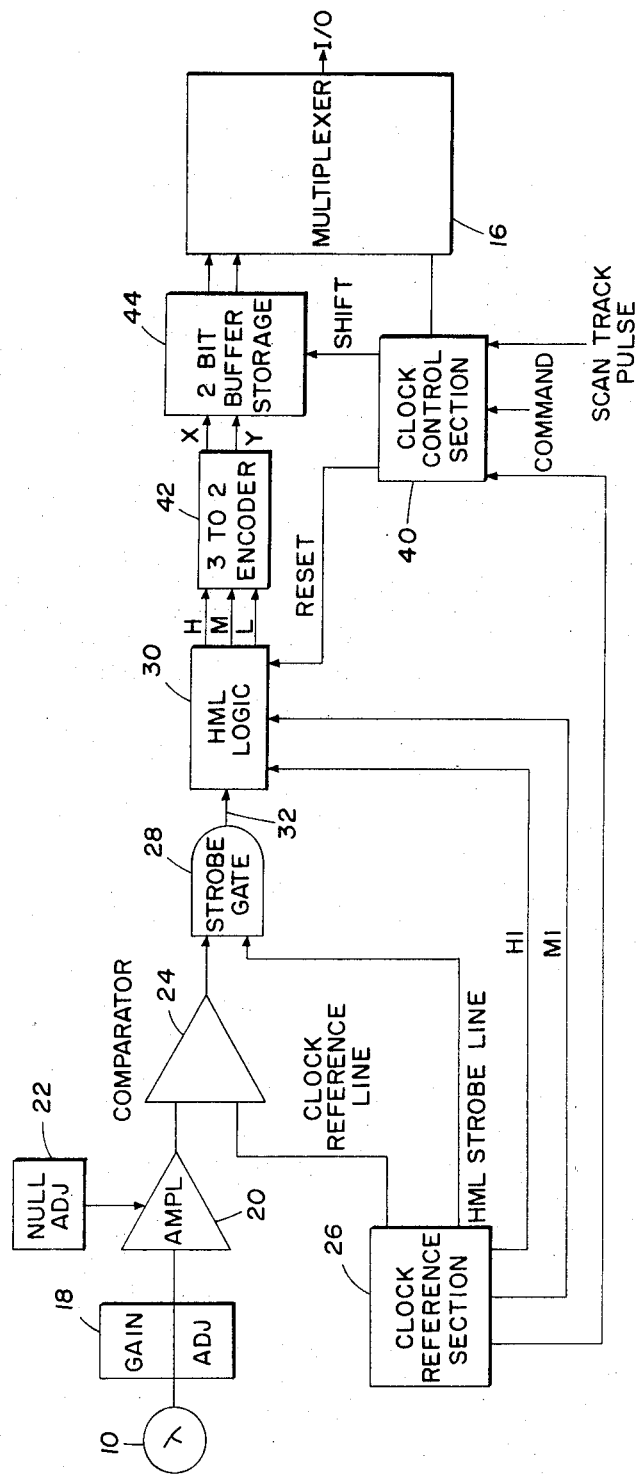

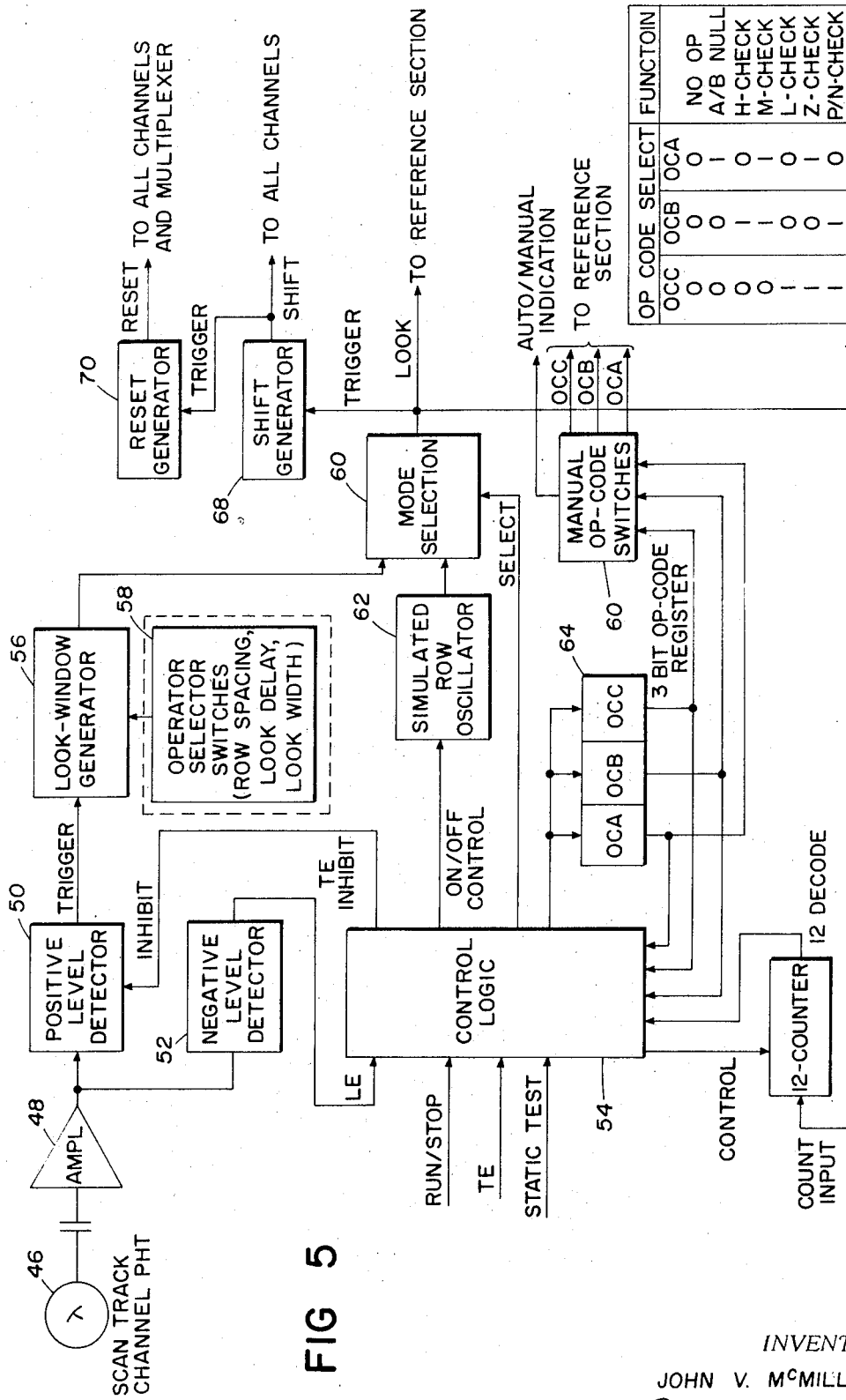

DIGITALLY CONVERTED ANALOG DISCRIMINATION SYSTEM

BACKGROUND OF THE INVENTION

The invention relates to discriminator circuits and more particularly to a system for converting analog signals into digital coded outputs by comparing each analog signal to various reference levels and selecting the signal which has the desired value. The value thus selected from each signal can then be compared with other signals within a given grouping or within any other grouping.

Although there are other applications in which the principles of the invention can be utilized, the invention is particularly adapted for use in connection with document scanners for "reading" manually marked data records or documents which contain responses such as answers to tests, survey responses, inventory information or other data where it is practical to use mechanized reading. As is well known to those skilled in the art, automated optical scanning of response-coded pencil-marked documents is widely used, particularly in the educational field.

One of the many difficulties to automated optical reading of pencil-marked documents is the fact that the density and readability of marks is extremely variable. Marking pencils used may vary widely in the blackness of the mark made, and even if standardized marking pencils are used, the individual characteristics of the people using the pencils will produce a wide variation in the marks made on the paper. In addition, marks are often made in different forms such as dots, x's, check marks and are frequently not properly contained within the indicated mark response area on the pre-printed document. Also, people are often careless in making erasures and will frequently "doodle" on the document with the marking pencil which may lead to erroneous results in the automated reading of the document unless very sophisticated detection circuits and related computer software are employed to overcome these problems. Examples of such circuitry are disclosed in my earlier patents, U.S. Pat. No. 3,486,040 entitled "Selectively Controlled Transistor Discriminator Circuits" and U.S. Pat. No. 3,524,048 entitled "Document Reading Device Having Discriminator Circuits."

In addition to the above variables, paper stock used in the manufacture of the documents, the condition of the document at the time it is optically scanned, and other sometimes unforeseen variables make accurate automated reading of the documents extremely difficult.

Moreover, even if none of the foregoing variables existed on a given document, it is often desirable and usually necessary to be able to discriminate between two to or more marks within a predetermined set of responses and sometimes, to further discriminate between, for example, the darkest mark occurring in each of two or more different sets of responses (usually defined as "area" or "matrix" discrimination). With prior art systems, discrimination among marks in a single row of data which was being simultaneously read by multiple photo sensors was difficult but could be accomplished with sophisticated circuitry, as shown in my earlier patents, U.S. Pat. No. 3,486,040 and U.S. Pat. No. 3,524,048 referred to above. However, with prior art systems it was impossible to compare or discriminate between marks successively read (e.g., time sequentially) in a single data channel or to accomplish "area" discrimination, i.e., between a mark in a given set of responses and another mark in a different set of responses. Thus, selective discrimination in prior art document readers was very limited. Since there are a number of useful applications for more selective and wider discrimination in document readers, improved systems for accomplishing these objectives are needed.

SUMMARY OF THE INVENTION

My novel discrimination system is designed primarily for optical document scanners which use a reflected light reading head for mark sense and/or punched hole document reading. My novel system converts the analog light intensity signal from each photo sensor into a multi-level digital code. The digital coded signal for each channel can thus be stored and compared with the digital coded signal produced in any one or more additional channels. Also, since the analog signal produced by a data response is converted into a multi-level digital code, the converted digital coded signal can be stored and compared with any subsequent data response signal in the same or any other channel. Thus, true area or matrix discrimination results, and my novel system is, therefore, extremely flexible and is also modular so that it can be used with virtually any number of response channels, the data from which can be multiplexed, if necessary, onto practically any number of computer interfaced lines. Such multiplexing is required only when the number of input lines to the computer is less than twice the number of channels being read simultaneously in a given data row. Obviously, each digitally coded response can then be utilized and processed in many different ways depending upon the output information desired.

The basic system of my invention thus consists of multiple photo sensors, one for each data channel and additional ones for monitoring the reflectance level of the document being read and for reading preprinted timing marks for row synchronization of the system hardware. The signal produced by the photo sensor in each data channel is converted into a multi-level digital code, stored, compared and the appropriate signal selected, encoded and multiplexed onto computer interface lines with the coded responses from the other data channels. In any practical system, there will be multiple data channels, but regardless of the number of channels, timing and control signals and an analog reference signal will be provided to all channels from a common clock subsystem. The common clock system eliminates multiple hardware and greatly simplifies and minimizes the circuitry of each data channel in any system, and also permits extreme flexibility in adapting the system to many different applications without major redesign.

My novel system further has built into it extreme flexibility in reading responses of all types by providing a logic mark-detection signal which brackets the interval during which a data response is anticipated in each channel. The interval and symmetry of this "look window" can be varied according to the document formate. It provides for extreme selectivity and discrimination between data responses that could not be achieved with prior art discrimination systems.

My novel system also facilitates the use of routine self-tests which continuously check the discrimination hardware for proper operation and indicate the location and nature of most failures which can conceivably occur. These diagnostic self tests when used with a computer greatly facilitate checkout, adjustment and trouble shooting of the discrimination system in the field quickly and easily. These self tests can be programmed into the document scanner so that they are continuously conducted during the scanning of documents. Such diagnostic self tests have obvious advantages and greatly increase the accuracy and "integrity" or "confidence factor" of the information read and practically eliminate errors attributable to system hardware failures and improper adjustment.

The foregoing features of my novel system as well as additional features will be more readily evident from a description of the preferred embodiment contained herein taken in connection with the accompanying drawings, a brief description of which follows.

BRIEF DESCRIPTION OF THE DRAWINGS

FIG. 2 is a block diagram of a single data channel of the discrimination system of my invention;

FIG. 5 is a block diagram of the control section of the clock subsystem;

FIG. 5A is a table showing the correlation between the selected coded outputs and functions produced by a portion of the clock control section of FIG. 5;

DESCRIPTION OF THE PREFERRED EMBODIMENT OF THE INVENTION

Figure 1:
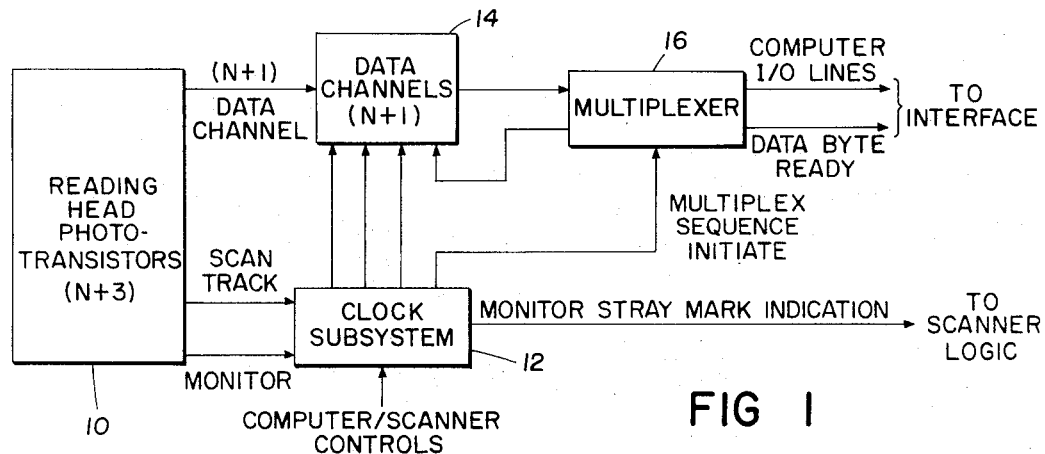
FIG. 1 is a simplified block diagram of a basic discrimination system incorporating the features of the invention.

In FIG. 1 of the drawings, there is shown a simplified block diagram of a system incorporating the features of my invention. The discrimination system is comprised of four main hardware grouping arranged according to their functions. The first grouping is the reading head phototransistors 10, there being "N + 3" phototransistors provided in the reading head, where "N" represents the number of data response channels. As indicated in FIG. 1, one of the phototransistors 10 reads preprinted scan-track marks on the document which provide timing signals for row synchronization of the system hardware. One of the other phototransistors 10 is a monitor channel which scans a blank area of the document where no preprinted or response marks are located for the purpose of monitoring the light intensity reflected by the document itself. This compensates for lamp aging, variations in lamp supply voltage and temperature changes in the reading head. As indicated in FIG. 1, the output signals of these two phototransistors 10 are utilized as control signals for the clock subsystem, indicated by the reference numeral 12, which is the second main group within the discrimination system. Further details of the scan track and monitor phototransistors 10 as well as the clock subsystem are described hereinafter.

The output signals from "N+1" of the phototransistors 10 comprise the data channels 14 which are the third main grouping of the discrimination system. These data channels 14 represent all of the data response channels plus a sheet-code channel which reads preprinted code marks on the document that are used to identify the particular document to the computer. However, since no hardware distinctions are made between the sheet code channel and the data response channels, they are all considered together as one of the main groupings in the discrimination system.

The fourth and last main hardware grouping within the overall system is the multiplexer 16 which provides the hardware for converting the parallel 2-bit code per "N" channel outputs from the data channels 14 into "W" serial words of "M"-bit width data onto "M" common lines for computer interfacing. The relationship for conversion is expressed as $W = 2^N/M$. For example, to transfer data from 64 channels (a typical number of channels for a standard 8½ inches wide document) to a computer having 16 lines, eight 16-bit words would be multiplexed during the transfer of a single row of data from all channels.

DATA CHANNELS

Figure 4:
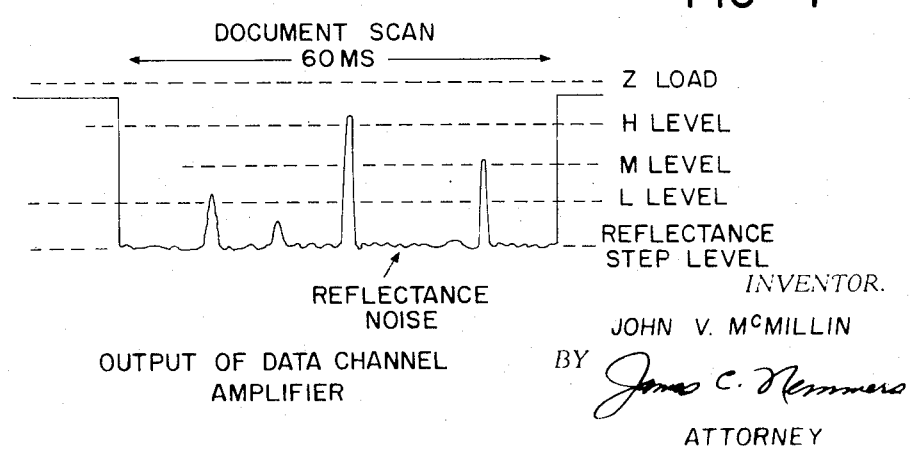
FIG. 4 is a chart illustrating the analog output of a phototransistor amplifier for a typical data channel.

As previously indicated, an independent channel 14 is associated with each of the "N + 1" data channel phototransistors 10 in the reading head. FIG. 2 diagramatically illustrates each such data channel 14. The signal from each channel phototransistor 10 goes through a gain adjustment potentiometer 18 which varies the input signal voltage to the linear-gain phototransistor amplifier 20. This gain adjustment is used to compensate for the variation in gain between individual phototransistors since no two phototransistors are exactly identical. In other words, the gain adjustment potentiometer 18 makes it possible to tune each channel for the same reflectance step-level output from the phototransistor amplifier 20. The "reflectance step-level" can best be explained as follows. With no document under the reading head, the output of the phototransistor amplifier 20 is zero volts since the surface opposite the reading head is black and consequently the phototransistor picks up no reflected light. When a document enters the head and reflects light back to a phototransistor 10, the output of the amplifier 20 goes negative to a level representing the amount of reflectance from the blank paper. This negative level is the " reflectance step-level" and is illustrated in the chart of FIG. 4. Any mark on the paper will cause the output of amplifier 20 to go positive from the reflectance step-level depending on the density of the mark. The peaks shown in FIG. 4 represent marks of varying densities, and a theoretically perfect "black mark" would cause the output to return all the way to zero volts at the output of amplifier 20. In actual practice, however, the darkest-made mark will be about 80 – 90 percent of the "absolute black" level. Thus, the gain adjustment potentiometer 18 provides an adjustment to compensate for variations in individual phototransistors 10 so that the reflectance step-level will be the same for all the data channels 14. Thus, a mark of a given density in one channel will produce the same upward excursion in signal level in its output amplifier 20 as a mark of the same density in another channel because the steps have been equally tuned to the same reflectance-reference level.

The amplifier 20 merely serves to linearly amplify the output signal from the phototransistor 10 to a level sufficient for reliable discrimination, and to drive the logic comparator 24 at the proper voltage levels. The inherent voltage and current offset of the operational amplifier 20 is balanced out by a null adjustment potentiometer 22 which is set to give an amplifier output of zero volts when the channel phototransistor 10 is dark, that is, with no document under the reading head.

Figure 7:
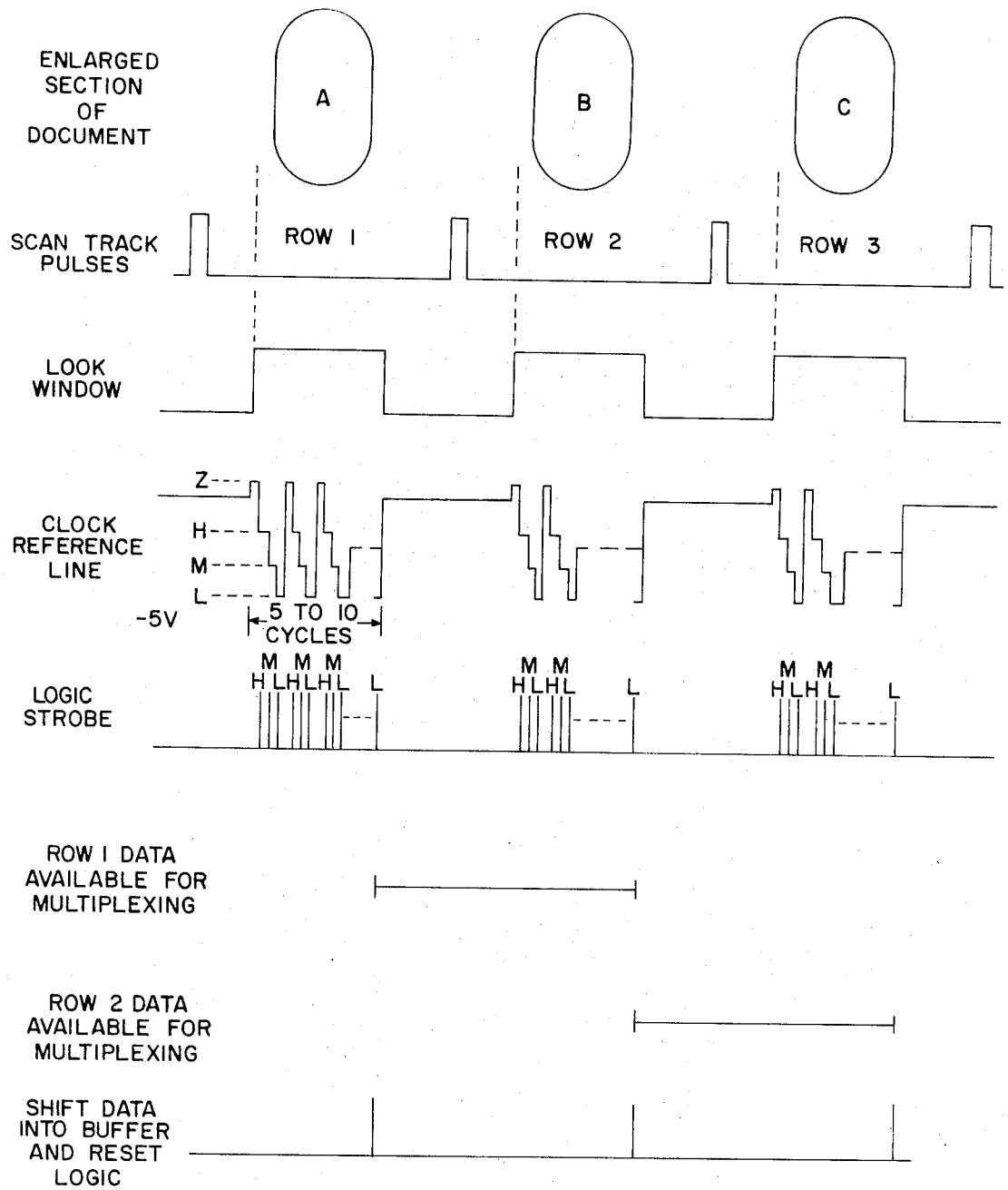
FIG. 7 is a chart illustrating the time sequence during a normal scanning mode.

The analog to digital conversion of the analog light-intensity signal from the phototransistor 10 amplified by amplifier 20 is accomplished by a differential amplifier 24 connected as a comparator. The reference voltage for comparator 24 is supplied by the clock reference section 26 which is a portion of the clock subsystem 12 and will be described in more detail hereinafter. However, as indicated in FIGS. 4 and 7 the clock reference signal is a sequence of cyclically varying reference voltages representing high (H), medium (M), and low level (L) marks, and a reference level (Z) which is higher than a 100 percent density mark. These reference levels divide the analog output signal from amplifier 20 into high, medium, light and "no mark" conditions since the comparator 24 will provide a digital logic transition at its output whenever the mark density read by phototransistor 10 and amplified by amplifier 20 exceeds the respective HML-Clock reference level thereby indicating whether the mark density is high, medium, low or no mark.

The HMLZ-Clock reference levels can be adjusted and varied either manually or under computer control according to the wishes of the user and the document type and format. It is not necessary, for example, for difference between each level to be the same or for the levels to span the entire reflectance step level of the amplifier 20. These clock reference levels are graphically illustrated in FIG. 4 with the clock cycles illustrated in FIG. 7. Further details with respect to the clock cycles will be described hereinafter in connection with the clock subsystem. However, as indicated in FIG. 7 a plurality of clock cycles will be produced during each "look window" interval for each response.

The output of the comparator 24 is gated with the strobe line from the clock reference section 26 through strobe gate 28. As illustrated in FIG. 7, the strobe line "windows," section from the center of each appropriate step of the clock reference cycle in order to eliminate transient effects in the output of comparator 24 during the level-transition switching intervals of the clock reference line.

Figure 3:
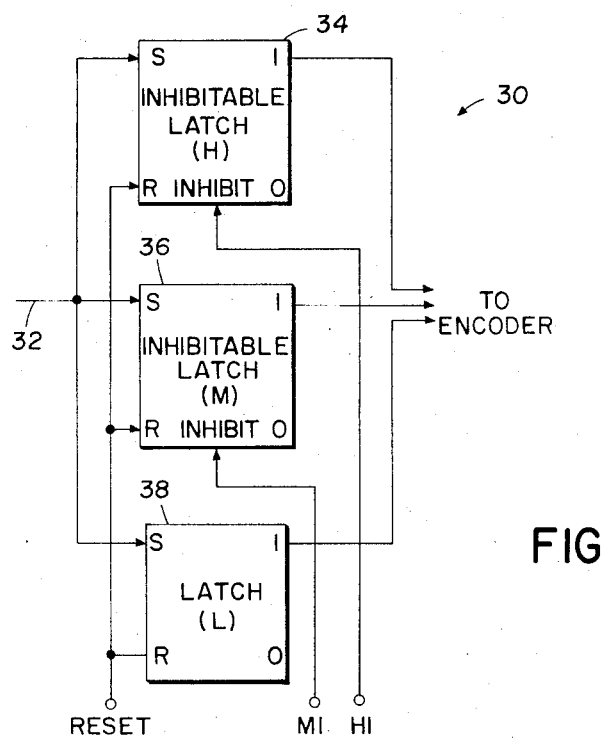
FIG. 3 is a more detailed diagram of a portion of one data channel illustrating the logic for storing and comparing the digital coded signals from a single data response.

The output of the strobe gate 28 drives the SET input of three RS latches connected in parallel and which form the HML logic 30. FIG. 3 is a detailed breakdown of the HML logic and line 32 is the output of the strobe gate 28. The HML logic 30 is mainly comprised of three latches, the H-latch 34, M-latch 36, and L-latch 38. Latches 34 and 36 are inhibitable according to the following rules:

1. If an inhibit input to the latch is a logic I before a set-pulse and remains a I for the duration of the set-pulse, the latch cannot be set.
2. Regardless of whether the latch is set or reset, no condition on the inhibit input can change the state of the latch.
3. Regardless of the state of the latch or of the inhibit line, a reset pulse will cause the latch to be reset. As shown in FIG. 2, the inhibit inputs HI and MI to the inhibitable latches 34 and 36 are controlled from the clock reference section and the reset line is controlled from the clock control section 40.

The HI line (HIGH-Inhibit) is logic "1" during the M and L reference levels of the clock reference section 26, and thus any mark-level detected during this interval cannot set the H-latch 34. During the H reference level, however, the HI line is logic "0," and if an H-level mark is strobed from the output of comparator 24 through strobe gate 28, the H-latch 38 will be set. The M and L latches 34 and 36 will also be set at this time if they were not previously set by correspondingly lower-level marks during their respective strobe times in an earlier clock cycle.

The MI line (MEDIUM-Inhibit) is logic "1" during the L reference level of the clock reference section 26, and thus any mark level detected during this interval cannot set the M-latch 36. During the M and H reference levels, however, the MI line is logic "0," and if an M-level or H-level is strobed from the output of the comparator 24 through the strobe gate 28, the M-latch 36 will be set. The L-latch 34 will also be set at this time if it has not already been set by L-level mark during its respective strobe times of an earlier clock cycle.

Both HI and MI lines are logic "0" during the Z portion of the clock reference cycle, but no strobe pulses from the clock reference section 26 are applied to the strobe gate 28 during this time, and therefore, none of the H, M and L latches 34, 36 and 38 are set during this period. Since the HI and MI lines are synchronous with the steps of the clock reference line as explained above, latches 34, 36 and 38 are appropriately designated H, M and L corresponding to heavy or high, medium and light marking conditions. This gives a logical and unambiguous coding of the mark response level into 3 bits, which are the outputs of the three latches 34, 36 and 38. The resulting 3-bit code is as follows:

| Marking Conditions | Latch Outputs | | |
| --- | --- | --- | --- |
| | "H" | "M" | "L" |
| Heavy or High | 1 | 1 | 1* |
| Medium | 0 | 1 | 1 |
| Light | 0 | 0 | 1 |
| No Mark | 0 | 0 | 0 |

*(In some HML to 3-to-2 converter systems, this bit may be logic "0" at L during an H-level mark)

Note that the highest level encountered during a particular "look" period will be the level represented by the respective latch output. Thus, the three latches 34, 36 and 38 serve to store the output from strobe gate 28 until the latches are reset from the clock control section 40 at which time the highest mark-level encountered and stored by the HML logic 30 will be the appropriate output code from the latches 34, 36 and 38.

The 3-bit code produced on the output lines of the HML logic 30 represent the four possible marking conditions. However, it is preferable that the 3-bit code be coded into a "compacted" 2-bit code before multiplexing the output data to the computer interface. I have selected the Gray code because of the simplicity of the conversion from the three-bit to the 2-bit code. This is accomplished in the encoder 42 in which the two output bits, which I have designated X and Y are assigned as follows:

| Marking Conditions | Output Bits X | Y |
|---|---|---|
| Heavy or High | 1 | 0 |
| Medium | 1 | 1 |
| Light | 0 | 1 |
| No Mark | 0 | 0 |

After the 3-bit to 2-bit conversion in encoder 42, the two X and Y bits are stored in a buffer register 44 so that they will be available for multiplexing by multiplexer 16. As it will be explained more fully hereinafter, storage of the bits in the buffer register 44 makes the bits available for multiplexing for 100 percent of the time it takes to scan a row of response. This is a tremendous advantage since it gives sufficient time for multiplexing of the data onto common lines for computer interfacing and allows the computer I/O interface channel maximum time to read in the multiplexed data.

CLOCK SUBSYSTEM

The foregoing is a brief generalized description of the system of my invention. However, there are additional details and features from which the flexibility, simplicity and other advantages over prior systems are derived. One of the important features of my novel system is the utilization of the clock subsystem 12 to provide all the reference and timing signals necessary to control the system in its various modes of operation. As previously indicated, the clock subsystem 12 is divided into two sections, the clock reference section 26 and the clock control section 40. The clock reference section 26 controls all (N + 1) of the data channels 14 and the same clock reference section 26 can be used with virtually any number of data response channels. It will be evident to those skilled in the art that the use of the common clock subsystem 12 eliminates multiplicity of hardware and simplifies the design of each data channel logic. One example of this is the fact that a single comparator 24 can be used for each data response channel rather than using three comparators per channel for the HML reference levels during which a comparator-function is required. This obviously results in a hardware saving but also makes my novel system modular and contributes to the flexibility of the system and its ability for diagnostic self testing.

CLOCK CONTROL SECTION

In FIG. 5, there is illustrated a more detailed breakdown of the clock control section 40. Among others, the control section 40 provides the functions of "look window" generation, and shift and reset line generation. These and the other functions of the clock control section 40 will now be described.

The "look window" is a logic signal which brackets the interval during which a data response is anticipated. In other words, it is frequently not desirable to have the data response channels "active" (i.e., able to detect and store mark-levels) during the entire period that a row is being scanned. The interval of the "look window" is primarily determined by the format of the document being read. Some documents may require a "look window" interval of almost 100 percent of the row-scan time to capture a mark made anywhere in the inter-row space, while others may require only a 4 to 5 percent "look window" interval. For example, a document which has a tight grid in which the response areas are almost abutting will require a very short "look window" interval. Otherwise, a response marked in one data response area which overlaps into another response area might be read as a mark in both response areas when this is not the intent. By setting the "look window" interval very short, and timing that interval so that the response area is scanned only over the central portion of the response area, the marked response will be picked up only in its proper row. Prior art systems often use only a "point" strobe which might miss a typical mark entirely unless it is perfectly centered in the response area. By providing a variable "look window" interval in my discrimination system, it is possible to set the interval at the optimum time and for the optimum interval for any given document-format layout, hereby greatly minimizing the possibility of an erroneous reading of a data response. The only minimum-width limitation on the "look window" interval is that it must be long enough to permit a single HMLZ cycle by the clock reference section 26. As a practical matter, this is not a limitation because a single HMLZ cycle takes only about 1 – 2 percent of a typical row scan even in high speed scanners. Of course, the maximum-width of the look window may be 100 percent of the row scan time. The time sequence chart in FIG. 7 illustrates the relationship between the scan track time, the "look window" interval and the clock reference HMLZ cycles. Although the "look window" interval is user-determined by the format of the document as previously explained, the "look window" intervals determines the number of clock cycles. In other words, the HMLZ reference levels will be cycled from the clock reference section 26 during the entire "look window" interval. This allows the darkest portion of the data response area viewed during the "look window" interval to become the output from the HML logic 30, regardless of where the darkest portion of the mark occurs, time-wise, during the active "look window" interval. Moreover, the starting and termination points of the "look window" can also be adjusted by the user according to the document format. It is this ability of my system to select the darkest or most dense portion of a data response located anywhere on the document that gives it the ability to accurately and sensitively discriminate between a variety of responses.

The "look window" generation is triggered by preprinted timing marks on the document which, as previously explained, is one of the reading head transistors 10. The scan track phototransistor is indicated by the reference numeral 46 in FIG. 5. Phototransistor 46 is AC-coupled to its amplifier 48 with a coupling time-constant sufficiently short to remove the reflectance step level from the phototransistor output. Thus, a timing mark read by a phototransistor 46 causes the output of the amplifier 48 to be a positive pulse, referenced to ground. Also, the trailing edge of the document causes a positive pulse at the output of amplifier 48 whereas the lead edge of the document produces a negative pulse.

The output of the amplifier 48 goes to both a positive level detector 50 and a negative level detector 52. Each of these detectors 48 and 52 is a comparator with a fixed reference voltage thereby producing a digital output whenever the output of amplifier 48 exceeds either the positive or negative reference level. The output of the negative level detector 52 is the document lead edge signal which goes to the control circuits of the control logic register 54. The output of the positive level detector 50 is a digital signal which triggers the "look window" generator 56. The extra positive pulse caused by the trailing edge of the document is gated out by the TE inhibit line which is also generated in the control register 54.

The functions of the "look window" generator 56 such as delay in the lead edge signal and the duration of the "look window" are adjustable in discrete steps by selector switches on the operator control panel represented by reference numeral 58 in FIG. 5. The output of the "look window" generator 56 goes to a mode selector 60 which selects either the actual "look window" generator for the normal scanning mode or the signal from a simulated row oscillator 62 for a diagnostic test mode, as described hereinafter. The mode selector 60 is controlled by the control register 54 depending on the desired mode of operation. The desired operating mode is specified by a 3-bit code which in turn is controlled by the circuitry of the control register 54. The 3-bit code register 64 produces a 3-bit output which can be overriden by manual switches 66. The 3-bit operating code output goes to the combinational logic 67 (FIG. 6) of the clock reference section 26. The outputs of register 64 for producing the various functions are indicated in FIG. 5A. The operating code is controlled by the various inputs to the control register 54 as indicated in FIG. 5.

One additional function of the clock control section 40 is to generate the shift and reset pulses. As indicated in FIG. 7, the shift pulse occurs immediately after the trailing edge of the "look window." The shift generator 68 uses a negative transition of the "look" line to trigger a logic 1 pulse to strobe the multiple data response channel HML logic 30 into the XY buffer register 44. Also, as indicated in FIG. 7, the reset pulse occurs immediately after the shift pulse. The reset generator 70 uses the negative transition of the shift line to trigger a logic "0" pulse to all the data channels to reset the HML logic 30 in preparation for scanning in the data from the next row. Since the reset pulse occurs immediately after the data for each row is shifted into the buffer register 44 in each channel, a reset pulse is also a proper signal to initiate command to the multiplexer 16. From a study of the time sequence in FIG. 7 it becomes obvious that with my system, the time for multiplexing is not limited to the row-time remaining between "look window" intervals, but rather the analog data read and digitally converted during the "look window" interval is shifted into the buffer register 44 at which time the multiplexing operation is initiated. Since there is no necessity to clear the buffer register 44 until the next shift pulse at the end of the next "look window" interval, it is evident that 100 percent of a row scan time is available for multiplexing. The multiplexing for a row, however, will not occur until after the entire row has been scanned and will occur during the interval while the subsequent row is being scanned. Thus, while one row is being scanned, the data read for the preceding row will be multiplexed onto the common lines for computer interfacing. With prior art systems, it was either necessary to multiplex the data during the row-time remaining after it was read for "single buffered" systems, and if the scan time was for a reasonably long interval (which is often necessary), there was insufficient time to multiplex the data. This placed serious practical limitations on prior art systems which have been completely overcome by my novel system.

CLOCK-REFERENCE SECTION

Figure 6:
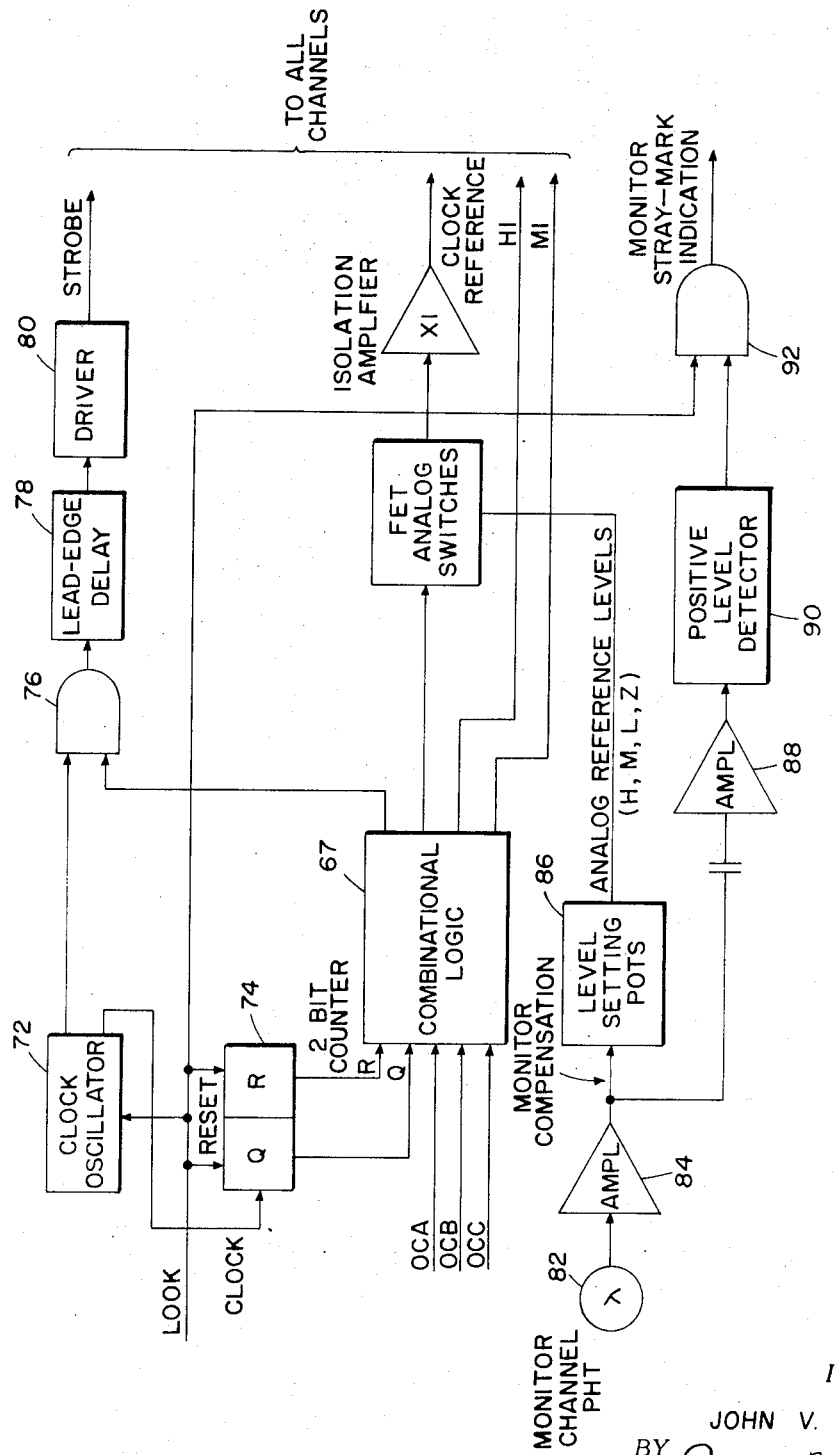
FIG. 6 is a block diagram of the clock reference section of the clock system.

In FIG. 6, there is a more detailed diagram of the clock reference section 26 of the clock subsystem 12. The clock reference section 26 serves multiple functions which include generation of the cyclical clock reference level signals, reflectance level monitoring, and strobe, HI and MI line generation. As previously indicated and shown on FIG. 2, the clock reference line provides a common voltage reference for all of the comparators 24 in the data channels. In the normal scanning mode, the HMLZ voltage reference levels are generated cyclically as previously explained. The duration of each level on the clock reference line is determined by the period of the clock oscillator 72. This oscillator 72 is controlled by the look signal from the clock control section 40 such that the oscillator 72 is running only during the "look window" interval, In order to derive four distinguishable intervals in each cycle on the clock reference line, the oscillator 72 is counted down by a two-bit Johnson counter 74 which is also controlled by the look signal from the clock control section 40.

The signal on the strobe line which is gated with the output of the comparator 24 into the strobe gate 28 (see FIG. 2) is generated by the combinational logic 67 (FIG. 6) which is gated into gate 76 with one side of the clock oscillator 72. The output of gate 76 is delayed by lead-edge delay 78 and power buffered by driver 80 before the strobe signal is given to all of the data response channels. The lead-edge delay is necessary to delay the issuing of the HML-strobe pulse to the comparator 24 until after the transitional effects of the clock-reference levels (Z to H, H to M, and M to L) have subsided.

The combinational logic 67 also generates the HI and MI signals which are given to the HML logic 30 contained in each of the data channels. The HI (HIGH-Inhibit) and MI (Medium-Inhibit) signals are required, as previously discussed, for the proper H, M or L levels to be set in the H, M and L latches 34, 36 and 38 according to the analog level of the mark detected.

The remaining phototransistor of the reading head phototransistors 10 is the monitor phototransistor 82 indicated in FIG. 6. The phototransistor 82 is used to compensate for lamp aging, variations in lamp supply voltage and temperature changes in the reading head.

Compensation is accomplished by using the phototransistor signal as amplified by its amplifier 84 for the supply voltage from which the analog reference levels are derived. Thus, the voltage at each of the arms of the level setting potentiometers 86 represents a certain percentage of the output voltage from the monitor phototransistor amplifier 84. If the monitor channel is initially tuned to the same output level as the data channel amplifiers 20, variations due to the foregoing mentioned factors will be correlated in the monitor output to the same degree as the data channel outputs. Thus, the various analog reference levels will remain a constant percentage of the reflectance step level, and each comparator 24 can make a "true" decision regarding the amplitude of a given mark level with respect to the H, M, L or No Mark amplitudes. It is, of course, possible for a stray mark to appear in the monitor channel. If this occurs, an abnormal condition exists which upsets the monitor compensation scheme just described, particularly if a stray mark is of sufficient intensity to cause the monitor compensation circuit to erroneously alter the reference voltage supply level. Such an erroneous alteration would invalidate the proper generation of the clock reference levels. In order to detect this possible error condition, the output of the monitor amplifier 84 also is AC-coupled (with a short time-constant to remove the reflectance step level) to the input of amplifier 88 whose output is connected with a positive level detector 90. The output of positive level detector 90 is gated with the look line into gate 92 so that if a positive pulse of sufficient amplitude (as determined by the threshhold of level detector 90) occurs in the output of the monitor channel during a "look window" interval, the level detector 90 will be a logic I pulse which goes to the interfacing/scanner logic for halt and indication.

SUMMARY

From the foregoing detailed description of the various subsystems, it will be obvious to those skilled in the art as to how the discrimination system of my invention operates. In summary, however, the system performs the analog to digital conversion of the reflected light-intensity signal of each data channel by a series of sequential comparisons. Each channel of a multiple channel system has its own comparator 24 which compares the amplified signal from a data phototransistor 10 against a reference voltage. A clock subsystem 12 cyclically varies the reference voltage through a sequence of values representing high, medium and low level marks and a reference level which is higher than a 100 percent density mark. The comparator 24 in each channel provides a digital output whenever the mark density exceeds the respective reference level, which gated output is stored in the HML logic 30. During a typical row scan time, as defined by the "look window" interval, the clock subsystem 12 will sequence a reference voltage to each comparator 24 through multiple cycles of the four discrimination levels. The result will be stored so that the highest level encountered during the "look window" will dominate and this level will be coded into a 2-bit word. A 2-bit word from each channel is stored in the buffer register 44 so that it will be available for output multiplexing during the row scan time for the subsequent row. In a typical multiplexing operation, the multiplexer 16 will take the 2-bit words from eight channels at a time to make 16-bit output word. Obviously a multiple channel system of greater than eight channels requires that a plurality of the 16-bit words be read out for each document row. As previously explained, for computer interface inputs with M lines, the number of channels multiplexed per word is M divided by 2.

DIAGNOSTIC SELF TESTING

My novel system as previously indicated lends itself extremely well to various diagnostic tests since most possible operating conditions can be easily simulated. The first diagnostic test is a static test, designated the A/B Null test, which checks the output voltage of the phototransistor amplifier 20 in each channel to determine if it lies within predetermined null limits. The test levels are cycled alternately on the clock reference line (see FIG. 2) and the H level logic strobe is generated during the positive level limit and the L level strobe is generated during the negative level limit. Since the output of the phototransistor amplifier 20 should be below the positive level limit and above the negative level limit, the output of the channel should look like an L mark, and if this output is give, the channel successfully passes the test.

The next diagnostic test is also a static test designated the H-logic test. The clock reference line is cycled through the same sequence of levels as during normal scanning (i.e., the HMLZ levels) but only the H level strobe is generated. Since this is a static test with no document being fed through the scanner, the output of each phototransistor 10 in a data channel should be equivalent to a 100 percent density mark because the surface opposite the phototransistor 10 is black. The channel output should be an H indication.

The third test is designated the M-logic test. Again, the clock reference line is cycled through the normal scanning sequence but only the M level strobe is generated. Since no document is being read, the channel output should give an M indication.

The fourth static test is designated as the L-logic test. The clock reference is cycled through the normal scanning sequence but only the L level strobe is generated and the channel output should indicate an L mark.

The fifth test is also a static test and is designated as the Z-logic test. As previously explained, the Z reference level is a level more positive than a 100 percent density mark and is used as part of the normal scanning cycle to provide a reference period during which each data channel comparator 24 will always be off. In the Z-logic test, the clock reference is in the read cycle and the H level strobe only is generated and time-shifted into the Z-portion of the clock reference section 26. The proper output of the channel is a "No Mark" indication and any other combination indicates a failure in the logic timing, failure of the logic to reset or failure of the comparator.

If a data channel passes the foregoing five static test, then all the logic is working properly and the phototransistor amplifier is nulled properly for each channel.

The sixth and final test is a dynamic test of the amplifier tune level designated as the P/N TUNE test. This test is performed for one simulated row on the blank lead-edge and one row on the trail-edge of each document during normal operations. The data from these two test rows is multiplexed with the response data simulating two extra document rows. Two preselected levels are cycled on the clock reference line to determine if the reflectance step level falls within the limits of the two levels. The H and L strobes are generated so that, as in the first static test, the proper output is an L indication. Too much gain in the amplifier will give a "No Mark" indication and too little gain will give an H indication. Also, a failure of any type in the amplifier circuit will be detected.

The foregoing tests illustrate that it is a relatively simple matter to check the proper functioning of the logic of the system, and that by diagnostic manipulation of the clock-reference levels in the clock subsystem 12, all data channels 14 are thoroughly verified for proper operation. If desired, the computer can be programmed so that these tests are periodically run throughout the reading of a group of documents in order to check for any malfunctions that might occur.

Furthermore, it is a relatively simple matter to design and print specially formulated test/diagnostic documents with various patterns of preprinted HIGH (H), Medium (M), Low (L) levels and blank (No Mark) marks located in the data response channels of this test document. Using the sheet code channel (one of the data channels 14) to identify a particular document as a test/diagnostic document, the on-line computer can then compare the row-scan data for a given diagnostic-document scanning cycle against the correct pre-stored pattern, analyze any discrepancies, and indicate the results for corrective purposes when required. This capability of my novel system for diagnostic self testing is a great advantage for field checkout, adjustment and trouble shooting.

Having thus described my invention, it will be obvious to those skilled in the art various revisions and modifications can be made in the preferred embodiment disclosed herein without departing from the spirit and scope of the invention. It is my intention, however, that all such revisions and modifications as are obvious to those skilled in the art will be included within the scope of the following claims:

I claim:

1. In an apparatus for reading a document containing a plurality of data response areas arranged into columns and row, a system for reading and discriminating among multiple data responses, said system comprising a plurality of data channels corresponding in number to at least the number of data columns to be read, each data channel including a sensor that produces an analog signal corresponding to the density of the response area being read, a clock system providing for all data channels a plurality of signal reference levels during each of a plurality of cycles during the look interval each data row is being scanned, said clock system generating a signal that determines the look interval during which each data channel is actively reading during each data row scan period, control means for variably controlling the starting point and duration of said look interval, comparative means in each data channel for comparing the analog signal from said sensor with each of said reference levels from said clock system, said comparative means providing an output indicating the magnitude of the analog signal from the sensor as compared to each reference level, first storage means in each data channel for storing the outputs from said comparative means during each data row scan, means in each data channel for providing a selected output from said first storage means indicating the selected level of all outputs received in said storage means during a data row scan, and means for converting said selected outputs into a code for computer utilization.

2. In the apparatus of claim 1 in which a second storage means is provided for storing the coded output bits from each data channel, and a multiplexer is provided for multiplexing onto computer interface lines the bits from said second storage means from all the data channels, the data stored in said first storage means being shifted to said second storage means immediately at the end of each look interval, said multiplexing taking place immediately after said shift.

3. In an apparatus for reading a document containing a plurality of data response areas arranged into columns and rows, a system for reading and discriminating among multiple data responses, said system comprising a plurality of data channels corresponding in number to at least the number of data columns to be read, a monitor channel including a sensor positioned to scan a blank area of a document being read, means combined with said sensor to set a basic reflectance level for said data channels, each data channel including a sensor that produces an analog signal corresponding to the density of the response area being read, a clock system for providing a plurality of signal reference levels during the time each data row is being read, comparative means in each data channel for comparing the analog signal from the data channel sensor with each of said reference levels from said clock system, said comparative means providing an output indicating the magnitude of the analog signal from the sensor as compared to each reference level, first storage means in each data channel for storing the outputs from said comparative means during each data row scan, means in each data channel for providing a selected output from said first storage means indicating the selected level of all outputs received in said storage means during a data row scan, means for converting said selected outputs into a code for computer utilization, means in said clock system for generating two additional preselected reference levels one above and one below said basic reflectance level, means for reading a simulated data row at the time the blank lead edge of a document would be in position for reading and at the time the blank trailing edge of a document would be in position for reading, and means for strobing selected ones of said reference levels during the generation of such two additional reference levels.

* * * * *